US012565021B1

(12) United States Patent
Saddoris

(10) Patent No.: US 12,565,021 B1
(45) Date of Patent: Mar. 3, 2026

(54) SADDLE PAD FLEX-PLATE ASSEMBLY

(71) Applicant: The Donna M. Saddoris Revocable Living Trust Agreement, Urich, MO (US)

(72) Inventor: Donna M. Saddoris, Urich, MO (US)

(73) Assignee: The Donna M. Saddoris Revocable Living Trust Agreement, Urich, MO (US)

( * ) Notice: Subject to any disclaimer, the term of this patent is extended or adjusted under 35 U.S.C. 154(b) by 0 days.

(21) Appl. No.: 19/298,339

(22) Filed: Aug. 13, 2025

(51) Int. Cl.
| | |
|---|---|
| *B32B 5/18* | (2006.01) |
| *B32B 5/32* | (2006.01) |
| *B32B 7/12* | (2006.01) |
| *B32B 27/06* | (2006.01) |
| *B32B 27/30* | (2006.01) |
| *B32B 27/32* | (2006.01) |
| *B32B 27/40* | (2006.01) |

(52) U.S. Cl.
CPC .................. *B32B 5/18* (2013.01); *B32B 5/32* (2013.01); *B32B 7/12* (2013.01); *B32B 27/065* (2013.01); *B32B 27/304* (2013.01); *B32B 27/32* (2013.01); *B32B 27/40* (2013.01); *B32B 2250/05* (2013.01); *B32B 2250/24* (2013.01); *B32B 2266/0235* (2013.01); *B32B 2266/0278* (2013.01); *B32B 2266/06* (2013.01); *B32B 2266/08* (2013.01); *B32B 2307/7376* (2023.05)

(58) Field of Classification Search
CPC .... B32B 5/18; B32B 5/32; B32B 7/12; B32B 27/065; B32B 27/304; B32B 27/32; B32B 27/40; B32B 2250/05; B32B 2250/24; B32B 2266/0235; B32B 2266/0278; B32B 2266/06; B32B 2266/08; B32B 2307/7376
See application file for complete search history.

(56) References Cited

U.S. PATENT DOCUMENTS

| | | | |
|---|---|---|---|
| 4,827,701 A | 5/1989 | Gonzales | |
| 5,299,412 A | 4/1994 | Cudney et al. | |
| 5,802,823 A | 9/1998 | Woods | |
| 7,225,603 B2 | 6/2007 | Palmius | |
| 11,542,150 B2 * | 1/2023 | Saddoris | ................... B68C 1/12 |

(Continued)

FOREIGN PATENT DOCUMENTS

| | | |
|---|---|---|
| CN | 21921756 U | 6/2023 |
| DE | 202022003133 U1 | 1/2025 |

(Continued)

OTHER PUBLICATIONS

Marlex Polyolefin Plastics, Phantom Plastics, (Year: 2024).*

(Continued)

*Primary Examiner* — Nathan L Van Sell

(74) *Attorney, Agent, or Firm* — Lathrop GPM LLP; Robert J. Lambrechts

(57) ABSTRACT

A flex plate assembly for insertion into a pocket of a saddle pad of a saddle for an equine. The flex plate assembly includes at least one high density polyethylene (HDPE) layer encapsulated with a microcellular polyurethane layer between a top and bottom layer of closed cell polyvinyl chloride. The flex plate assembly is positioned within a pocket, on each side of the saddle pad, preventing excessive pressure upon the shoulder blades of the equine during natural movement of the equine.

8 Claims, 5 Drawing Sheets

(56) References Cited

U.S. PATENT DOCUMENTS

| | | | | |
|---|---|---|---|---|
| 2002/0162307 A1 * | 11/2002 | Arnold | ....................... | B68C 1/12 |
| | | | | 54/66 |
| 2008/0110138 A1 * | 5/2008 | Helms | ....................... | B68B 7/00 |
| | | | | 54/66 |
| 2013/0227920 A1 | 9/2013 | Munoz | | |
| 2020/0207607 A1 | 7/2020 | Benetti | | |
| 2021/0267167 A1 * | 9/2021 | Frishman | ................ | B32B 27/34 |
| 2022/0380198 A1 * | 12/2022 | Saddoris | ................... | B68C 1/02 |
| 2024/0059553 A1 | 2/2024 | Rasalingam | | |

FOREIGN PATENT DOCUMENTS

| | | | | | |
|---|---|---|---|---|---|
| FR | 2979907 A3 | 3/2013 | | | |
| GB | 2582891 A * | 10/2020 | | .............. | B32B 7/12 |
| GB | 2582891 B2 | 5/2023 | | | |
| IN | 202211054815 A | 3/2024 | | | |

OTHER PUBLICATIONS 3M, 3M Scrim Adhesive Tape 99786NP+ (Year: 2024).*
Rogers Corp, A Guide to Choosing a Poronâ® Polyurethane Material (Year: 2021).*
Evolutionary Saddles LLC, System X Panels (Year: 2023).*
Harris, Harris Leather and Silverworks, Fleece Lined Contoured Pad—Poron Insert, https://harrisleather.com/product/fleece-lined-contoured-pad-poron-insert, Oct. 28, 2025.
Mustang, Mustang Contoured Poron XRD Shim Fit Pad Tan Wool, https://www.amazon.com/Mustang-Manufacturing-Company-Poron-32X31X1/dp/B07KRHDSYH, Oct. 28, 2025.
Haynet, Inlays for Saddle Pads—Pur Foam, https://www.filet-a-foin.com/Inlays-for-saddle-pads-PUR-foam, Oct. 28, 2025.
Cavallo, Fully Monty Western Saddle Pad #FM1001, https://cavallo-inc.com/product/full-monty-western-saddle-pad/?srsltid=AfmBOoq n5m5Wr5nKhT0meGqIOCARGOOkCalEw2hvs4tDlnDvZ6g4 lhV2, Oct. 28, 2025.

* cited by examiner

SADDLE PAD FLEX-PLATE ASSEMBLY

FIELD OF USE

The flex plate assembly disclosed herein is directed to the reduction of pressure areas under a saddle tree of a saddle and a decrease in the restriction to natural movement of an equine caused by the framework of the saddle and associated girths, straps and rigging. The disclosed flex plate assembly utilizes layered flex-plates that distribute pressure and facilitate less restricted movement of the scapulae (shoulder blades) of the equine thereby improving equine mobility and performance.

BACKGROUND

Saddle pads have been used for centuries as an interface between the equine's back and the saddle, primarily serving to cushion the load of the rider, protect the equine's skin from chafing, absorb sweat, and distribute pressure across the back. Early saddle pads were typically constructed from wool, felt, or leather, and their design was largely rudimentary-prioritizing surface coverage and moisture wicking rather than biomechanical impact. With the evolution of equestrian sports and working disciplines, modern saddle pads have taken on greater significance not only as passive cushions but also as critical components in the kinematic interaction between saddle, rider, and equine anatomy.

Despite material and structural advancements, a persistent challenge in saddle pad design remains: scapular impingement, which occurs when the forward portion of the saddle pad and saddle interferes with the natural motion of the equine's scapula (shoulder blade). Anatomically, the scapula of the equine is a flat bone with a prominent ridge (spine) and a cartilaginous extension at its uppermost dorsal edge. Unlike the fixed scapula in humans, the equine's scapula is not directly attached to the ribcage by bone, but rather by a muscular sling, allowing for significant back-and-forth gliding motion during locomotion.

This scapular mobility is essential for stride length, shoulder extension, and overall gait fluidity. As the equine walks, trots, canters, or gallops, the scapula floats on muscle. The scapula's largest range of motion is forward and backward; however, the scapula also shifts medially and laterally and rotates a bit along its long axis. Because the scapula needs to slide well forward, saddles and breastplates must allow clearance over the dorsal scapular cartilage. Restricting that glide shortens the step and can make the horse tight in front. Improperly designed saddle pads and saddles can restrict this motion by placing rigid or unyielding materials directly over the scapular cartilage or flares. The result is a mechanical conflict between the pad and the bone's movement, which leads to localized pressure points, discomfort, inflammation, and even tissue damage.

Prior art has attempted to address this issue by introducing cutouts or recessed areas in saddle pads to accommodate scapular movement. However, such designs often sacrifice load distribution or overall saddle stability. Some have used memory foams or gel inserts to dampen pressure, but these materials frequently lack sufficient responsiveness, durability, or structural integrity under sustained compression or motion. Rigid inserts such as polycarbonate plates have also been employed to stiffen the saddle pad structure, but these materials can fail under dynamic flexure or create secondary pressure ridges that exacerbate the very issues they aim to prevent.

Recent advances in material science, particularly in compression set resistant foams and semi-flexible thermoplastics, offer opportunities to construct saddle pads that dynamically conform to equine anatomy while maintaining structural resilience. By incorporating engineered multi-layer assemblies with strategically placed, flexible load-distributing plates, it is possible to reduce peak pressure at key anatomical regions such as scapular cartilage, without impeding the necessary biomechanical functions of the equine.

SUMMARY

This disclosure provides an advanced, multi-layered flex plate assembly for use in equine saddle pads, offering significant improvements in pressure management, conformability, and long-term durability. This assembly addresses longstanding challenges in equine saddle pad design, most notably scapular impingement, localized pressure points, and material fatigue—by employing carefully selected, function-specific materials.

At the core of the invention is the replacement of outdated components—specifically, polycarbonate plates and closed-cell Nitrile Butadiene Rubber/Polyvinyl chloride (NBR/PVC) foams (e.g., MLC formulations)—with high-density polyethylene (HDPE) and compression set resistant open-cell microcellular polyurethane foam, respectively. These material substitutions yield a saddle pad insert that better protects the equine's back, enhances saddle fit, and preserves freedom of movement in critical anatomical regions such as the scapula.

In prior art designs, polycarbonate (e.g., Lexan®) plates have been used as internal stiffening layers. However, polycarbonate is inherently rigid, brittle under flexural stress, and prone to cracking or permanent deformation-particularly when subjected to repeated bending or cold weather conditions. In contrast, HDPE is semi-flexible, allowing for repeated dynamic bending without material failure. It is lighter than polycarbonate, provides superior impact resistance, and is better suited for applications requiring shape conformity to irregular, moving surfaces, such as an equine's shoulder and musculature during locomotion.

The use of HDPE in layered configurations with cantilevered fingers enables bi-directional flexure, accommodating scapular motion without resisting or redirecting it. This reduces the likelihood of pressure-induced soreness or restricted stride length. HDPE's flexibility also allows the material to dynamically distribute shifting loads, improving comfort over long-duration rides and reducing musculoskeletal fatigue in the equine.

Conventional saddle pad inserts have often utilized closed-cell NBR/PVC foams, such as medium-load compression (MLC) variants, for cushioning. While these materials offer initial firmness and moisture resistance, they suffer from compression set, poor impact attenuation, and limited anatomical conformity. Over time, closed-cell foams tend to permanently deform under load, losing their cushioning effect and failing to recover shape-leading to pressure buildup, especially at bony prominences like the scapular cartilage.

In contrast, the disclosed flex plate assembly employs a compression set resistant open-cell microcellular polyurethane foam, engineered for linear, consistent energy absorption. This material is viscoelastic, meaning it slowly compresses under load and gradually recovers, making it ideal for absorbing jarring forces transmitted through the saddle. The foam conforms intimately to both the saddle base and the equine's muscular and skeletal contours, improving load distribution and reducing the risk of pressure sores or inflammation. Moreover, its open-cell structure promotes air circulation, which improves thermal regulation and moisture management, critical for extended performance use.

The disclosed flex-plate assembly is sewn into both sides of the saddle pad at the withers (the ridge between the shoulder bones), along the spine, to the flanks, creating a base for the saddle tree to rest upon, which distributes the weight of the rider and saddle tree pressure more evenly over the equine's back. This distribution system allows the equine to be more balanced, and have a greater range of motion, thereby reducing pain and sore areas. The disclosed flex plate assembly increases comfort and stability of the equine and rider under saddle and has improved longevity due to the use of high-performance materials.

It is an object of the invention to provide a flex plate assembly that reduces scapular impingement in equines during locomotion by reducing or eliminating interference between the saddle or saddle pad and the equine's scapular cartilage by using a contoured, flexible structure that conforms to the natural motion of the scapula, thereby preserving range of motion and reducing soft tissue stress.

A further object of the invention to improve pressure distribution across the equine's back to prevent pressure points and soreness using layered impact-dissipating materials, thus minimizing high-pressure zones—especially over sensitive anatomical regions such as the scapula and loin.

A further object of the invention to replace rigid polycarbonate support layers with more flexible and durable HDPE structures with cantilevered fingers in place of polycarbonate materials, thereby enhancing flexibility, crack resistance, and conformation to anatomical contours during dynamic movement.

A further object of the invention to utilize compression set resistant open-cell microcellular polyurethane foam for long-term impact attenuation thereby offering superior energy absorption, shape recovery, and anatomical adaptability under repeated compressive loads.

A further object of the invention to improve moisture and thermal management within the saddle pad structure by promoting airflow and evaporative cooling using open-cell foam materials, thereby enhancing rider and equine comfort by reducing heat and sweat accumulation during extended riding periods.

A further object of the invention to enable modular integration of a flex plate assembly into standard saddle pad pockets.

A further object of the invention is to provide a flex plate assembly that may be securely inserted into existing saddle pad pockets using stitching or adhesive bonding, allowing for retrofitting into various saddle pad designs without the need for redesigning the entire pad.

DETAILED DESCRIPTION

Figure 1:
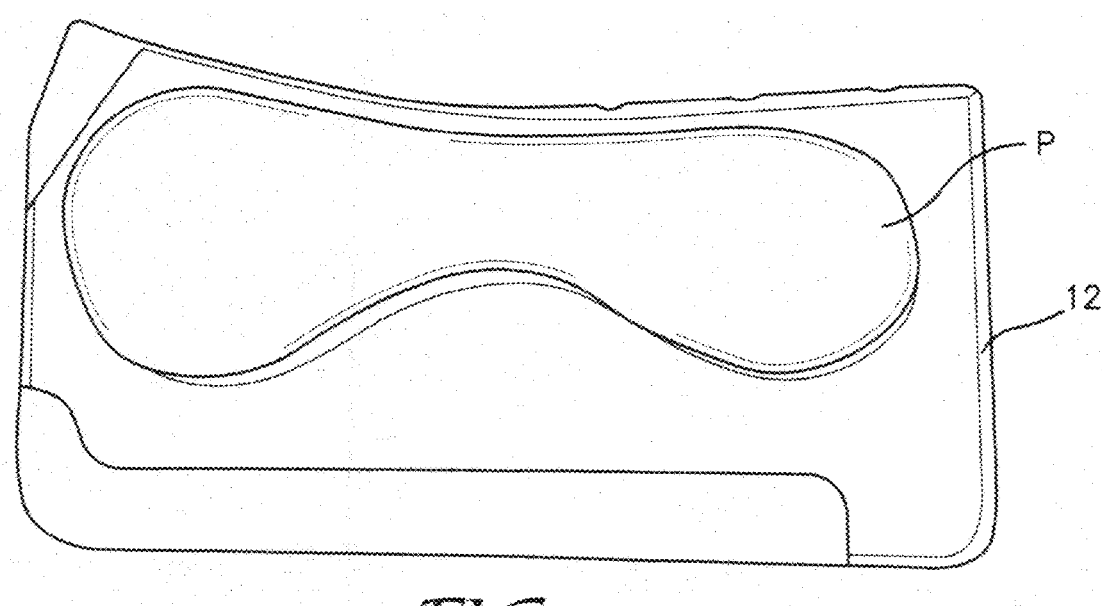
FIG. 1 illustrates an embodiment of a left side elevation view of a saddle pad with a pocket for retaining the flex plate assembly.

The following description is merely exemplary in nature and does not limit the present teachings, application, or uses. Throughout this specification, reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings.

The drawings furnished are intended to illustrate and plainly disclose presently envisioned embodiments to one of skill in the art but are not intended to be manufacturing level drawings or renditions of final products and may include simplified conceptual views to facilitate understanding or explanation. Also, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, steps, operations, elements, and/or components, but do not preclude the presence or addition of one or more other features, steps, operations, elements, components, and/or groups thereof.

The method steps, processes, and operations described herein are not to be construed as necessarily requiring their performance in the order discussed or illustrated, unless specifically identified as an order of performance. It is also understood that additional or alternative steps can be employed.

When an element, object, device, module, apparatus, component, region or section, etc., is referred to as being "on", "engaged to or with", "connected to or with", or "coupled to or with" another element, object, device, module, apparatus, component, region or section, etc., it can be directly on, engaged, connected or coupled to or with the other element, object, device, module, apparatus, component, region or section, etc., or intervening elements, objects, devices, modules, apparatuses, components, regions or sections, etc., can be present.

In contrast, when an element, object, device, module, apparatus, component, region or section, etc., is referred to as being "directly on", "directly engaged to", "directly connected to", or "directly coupled to" another element, object, device, module, apparatus, component, region or section, etc., there may be no intervening elements, objects, devices, modules, apparatuses, components, regions or sections, etc., present. Other words used to describe the relationship between elements, objects, devices, modules, apparatuses, components, regions, or sections, etc., should be interpreted in a like fashion (e.g., "between" versus "directly between," "adjacent" versus "directly adjacent," etc.).

As used herein, the term "and/or" includes all combinations of one or more of the associated listed items. For example, A and/or B includes A alone, or B alone, or both A and B. Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Although the terms first, second, third, etc., can be used herein to describe various elements, objects, devices, modules, apparatuses, components, regions, or sections, etc., these elements, objects, devices, modules, apparatuses, components, regions, etc., should not be limited by these terms. These terms may be used only to distinguish one element, object, device, module, apparatus, component, region, or section, etc., from another element, object, device, module, apparatus, component, region, or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because varying and different embodiments may be made within the scope of the concept(s) taught herein, and because many modifications may be made in the embodiments described herein, it is to be understood that the details herein are to be interpreted as illustrative and non-limiting.

Figure 2:
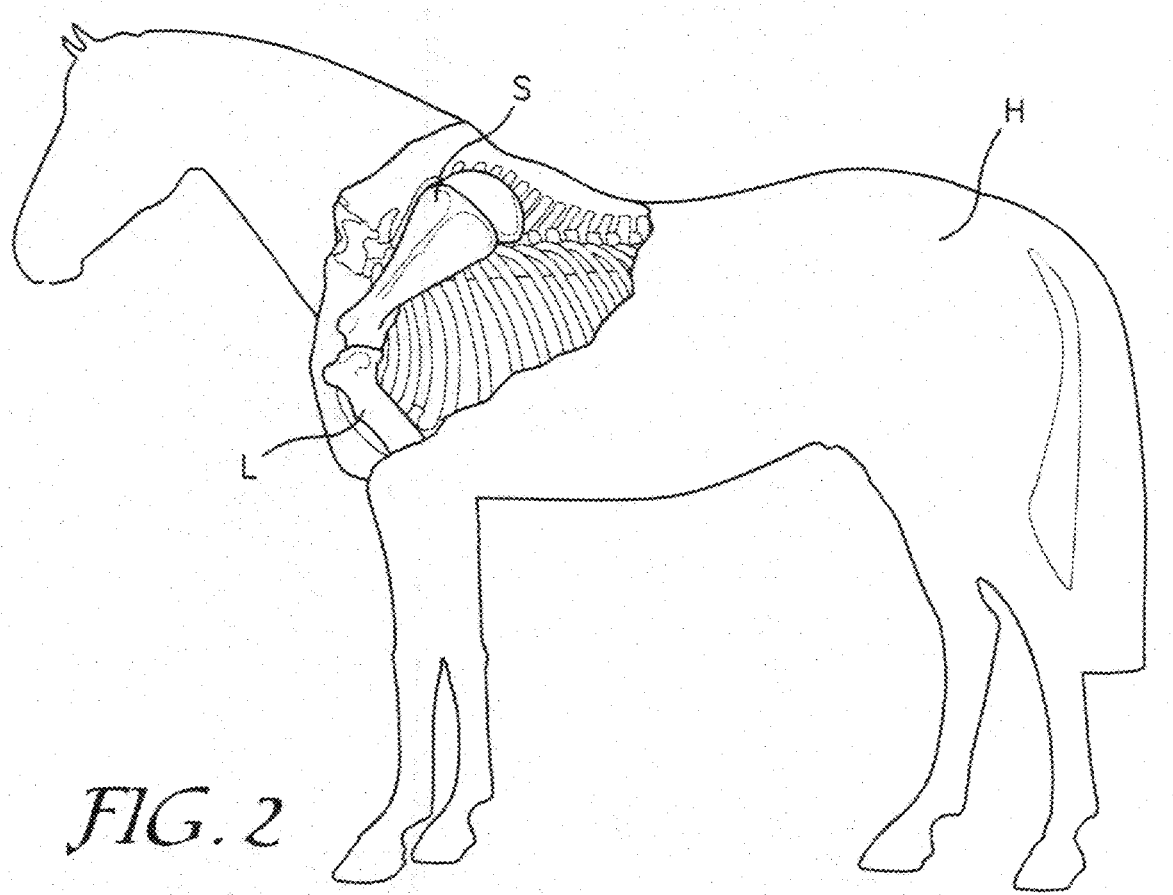
FIG. 2 illustrates an embodiment of a left-side of an equine showing the location of the humerus and scapula bones.

FIG. 1 illustrates a left side pocket P of a saddle pad. The flex plate assembly 10 disclosed herein is inserted into and sewn into pockets P of the saddle pad 12 and ultimately the saddle pad 12 is placed on the back of an equine. A basic understanding of the anatomy of an equine is critical for purposes of fully appreciating the technical details of the structure of the disclosed flex plate assembly 10. FIG. 2 illustrates the location and prominence of the scapula S of an equine and the connection of the scapula S to the leg bone L of the equine H.

Figure 3:
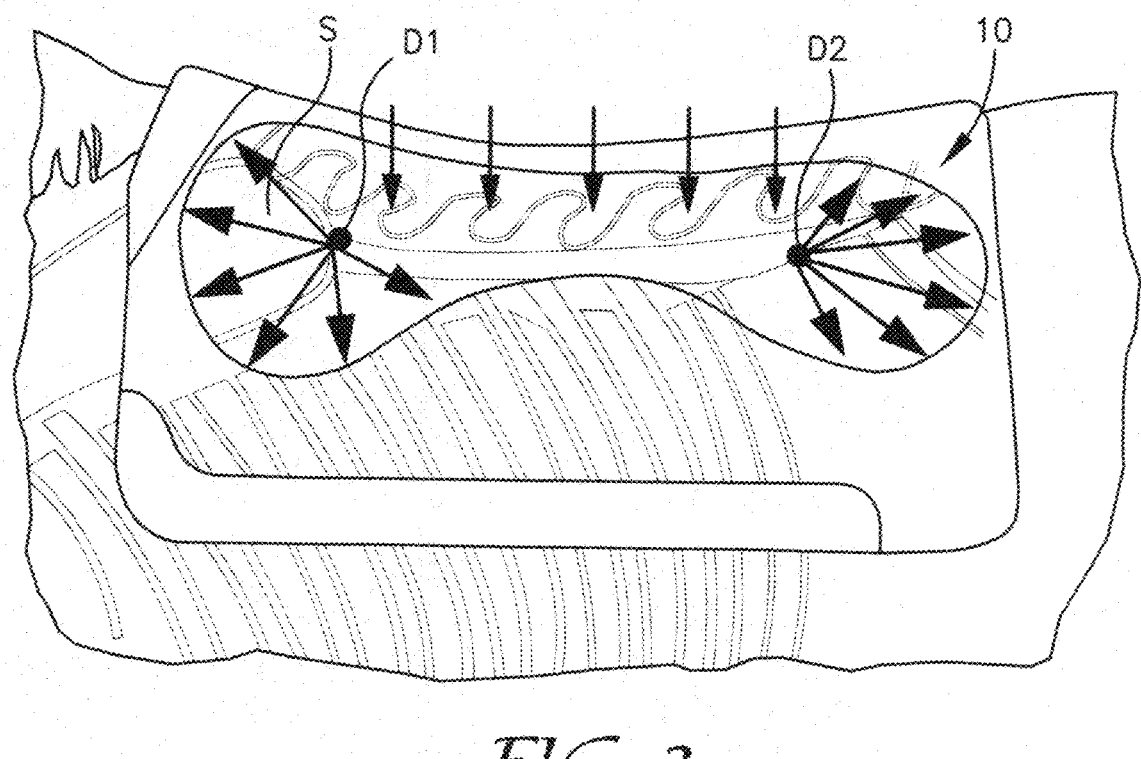
FIG. 3 illustrates the placement of the saddle pad upon the back of an equine with the flex plate assembly inserted into the saddle pad pocket and the distribution of pressure outward beneath the flex plates.

The scapulas S, on both sides of the equine's body, move forward and backward due to the movement of the leg bones L as the equine walks or gallops. FIG. 3 illustrates the placement of the disclosed flex plate assembly 10 over the scapular cartilage, the uppermost portion of the equine's scapula S (when the flex plate assembly 10 is sewn into the pocket of the saddle pad). FIG. 3 illustrates with arrows, the pressure points as dots D1, D2 with arrows radiating outward.

The forward dot D1 identifies a pressure point at the flares of the equine and details how the flex plate assembly 10 disperses the pressure outward from the dot D1 to cover a larger area thereby reducing the force per unit of area at the scapula S. The second dot D2, near the loin (muscular region between the last rib and the croup or the top of the hindquarters) and the associated arrows illustrate the distribution of the load to avoid concentrating too much pressure in any single small area.

Figure 4:
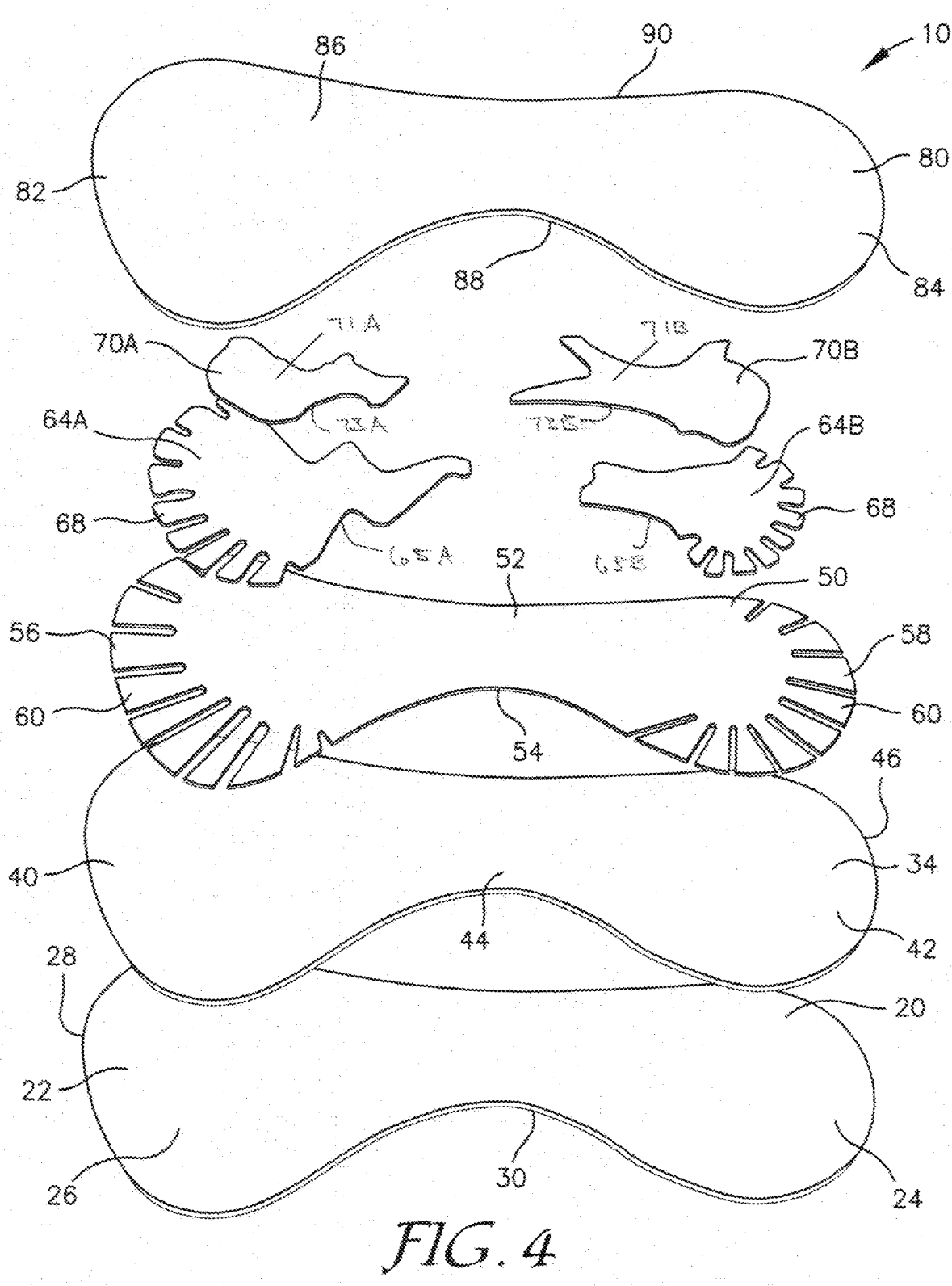
FIG. 4 illustrates an exploded view of the six layers of the flex plate assembly.

The fully assembled flex plate assemblies 10 are intended for insertion into both the left and right pockets P of the saddle pad 12. The flex plate assembly 10 as disclosed herein is illustrated at FIG. 4 and includes a first layer 20 fabricated from a closed cell polyvinyl chloride blown foam. The first layer 20 also includes first and second longitudinal ends 22, 24 an upper surface 26, a lower surface 28 and an outer edge 30. The polyvinyl chloride blown foam first layer 20 provides excellent cushioning to maximize the comfort of the equine and the rider. The thickness of the first layer 20 is preferably in the range of 0.10 to 0.15 inches.

The flex plate assembly 10 also includes a second layer 34 disposed atop and bonded to the upper surface 26 of the first layer 20. The second layer 34 is fabricated from a compression set resistant open-cell microcellular polyurethane foam. An exemplary set resistant foam for this application is Poron® produced by the Rogers Corporation of Massachusetts; however, other set resistant foams are also contemplated by this disclosure. The second layer 34 further includes first and second longitudinal ends 40, 42, an upper surface 44 and a lower surface 46. The thickness of the second layer is preferably in the range of 0.15 to 0.30 inches.

A compression set resistant open-cell polyurethane foam, such as Poron® is engineered specifically for energy absorption, is a viscoelastic foam that compresses and recovers slowly, dissipating impact forces over time. This type of foam has excellent impact attenuation without bottoming out—even under repeated or prolonged loads and it absorbs energy linearly and consistently, reducing jarring forces transferred to the equine's back and rider's seat. The open-cell polyurethane conforms easily to irregular surfaces (e.g., the equine's musculature), distributing pressure evenly across the back and reduces high-pressure points, such as at the scapular cartilage by molding to both the saddle and equine's contours.

The material is excellent for reducing risk of pressure sores, inflammation, or muscle fatigue and the open-cell structure allows airflow, improving moisture management and heat dissipation. Importantly, the open cell structure maintains performance characteristics over time, does not compress permanently under sustained use and retains up to 95% of its shock absorbing capacity even after prolonged compression cycles.

While closed cell polyurethane foam may have previously been considered a state-of-the-art material to use for the flex plate assembly, that material lacks impact attenuation, does not provide sufficient pressure distribution or long-term durability and comfort and does not conform to the equine anatomy as well as compression set resistant open-cell polyurethane foam.

In a preferred embodiment the flex plate assembly 10 also includes a third layer 50 fabricated from high-density polyethylene (HDPE). Prior saddle pad flex plate designs have utilized polycarbonate layers; however, extensive operational experience has revealed the drawbacks of using polycarbonate layers. The attributes of HDPE include greater flexibility with moderate stiffness such that the HDPE layer can bend repeatedly without breaking.

Polycarbonates tend to be extremely stiff and rigid, do not flex as easily as HDPE and are more prone to permanent deformation or cracking if overstressed in flex applications. HDPE also has higher impact resistance than polycarbonate, especially at low temperatures and the material is ideal for dynamic load distribution such as shifting pressure due to movement of an equine.

HDPE, due to its semi-flexible structure, helps to conform to muscle contours and shape shifts during motion of the equine. This shape shifting reduces pressure points, which prevents soreness due to scapular impingement and thereby offers a softer interface, which is better for comfort and freedom of motion, especially in dynamic zones like the scapula. HDPE is also lighter than polycarbonate and HDPE requires less thickness to achieve adequate protection while retaining flexibility. In summary, HDPE is safer for prolonged riding or intense motion as it poses less risk of interfering with scapular movement.

The third layer 50 includes an upper surface 52, a lower surface 54, oppositely disposed longitudinal ends 56, 58 a surface area of less than the first layer 20 and overlays a portion of the upper surface 44 of the second layer 34. The third layer 50 is preferably a contiguous layer extending across nearly the entire span of the second layer 34 with a plurality of cantilevered fingers 60 capable of bi-directional flexure.

The number of cantilevered fingers 60 on the longitudinally opposed ends 56, 58 of the third layer 50 is preferably in the range of 8 to 12. The thickness of the third layer 50 is preferably in the range of 0.04 to 0.08 inches and the gap between the cantilevered fingers 60 may range from 0.15 to 0.25 inches, the longitudinal span of the cantilevered fingers ranges from 1.5 to 3.0 inches, and the lateral span of the cantilevered fingers ranges from 1.2 to 2.0 inches.

The third layer 50 is secured to the second layer 34 preferably with an adhesive tape to prevent slippage of the third layer 50 upon the second layer 34. An exemplary adhesive is Double Coated Adhesive Tape 99786NP+ produced by the 3M™ Company. The double coated tape precisely matches the contours of and is applied to the lower surface 54 of the third layer 50. The precise matching of the contours of this layer with the double-sided tape is critical to maintaining adhesion of the third layer 50 to the second layer 20 particularly under the heavy loads applied to the flex plate assembly 10 during usage in the field.

Moreover, for use with HDPE, double-sided industrial tapes spread and flow to make intimate, continuous contact with the surface, filling micro-roughness and pushing out air. The referenced double-sided tape is formulated for low surface energy plastics thereby resulting in a robust bond with HDPE. The 3M™ tape uses a solvent-free acrylic system designed for high adhesion to many plastics and gives instant handling strength with a clean, controlled bond-line, ideal for laminating layers. By contrast, solvent-based contact adhesive with high VOCs and flammability, requires coating both faces, waiting for dry time, and then rolling at 30-40 psi which is messier and less predictable for HDPE stacks.

In a preferred embodiment, as illustrated at FIG. 4, disposed on top of the third layer 50 is a discontinuous fourth layer 64A, 64B of HDPE. The lower surface 65A, 65B of the fourth layer 64A, 64B is positioned respectively over the longitudinally opposed ends 56, 58 of the third layer 50. The fourth layer 64A, 64B also utilizes cantilevered fingers 68 that overlay to varying respects the cantilevered fingers 60 of the third layer 50.

Some fingers of the fourth layer 64A, 64B will closely overlay the cantilevered fingers of the third layer 50 while some will overlap adjacent cantilevered fingers 60 of the third layer 50. The thickness of the fourth layer 64A, 64B is preferably in the range of 0.03 to 0.05 inches, and the gap between the cantilevered fingers 68 varies and ranges from 0.25 to 0.35 inches. The longitudinal span of the cantilevered fingers preferably ranges from 0.5 to 1.25 inches, and the lateral span of the cantilevered fingers preferably ranges at the widest edge from 0.5 to 0.8 inches and at the narrowest to 0.2 to 1.0 inches. The fourth layer 64A, 64B is preferably fabricated from HDPE and the lower surface 65A, 65B is preferably bonded to the upper surface 52 of the third layer 50 using an adhesive such as the Double Coated Adhesive Tape 99786NP+ produced by the 3M™ Company.

As further illustrated at FIG. 4, a fifth layer 70A, 70B of HDPE with an upper surface 71A, 71B and a lower surface 73A, 73B is also preferably discontinuous and is secured with 3M™ Double Coated Tape detailed above to the upper surface of the fourth layer 64A, 64B. The fifth layer 70A, 70B is preferably smaller in area than the fourth layer and does not extend over the cantilevered fingers 68 of the fourth layer 64A, 64B. The purpose of the fifth layer 70A, 70B is to assist in spreading the load across a greater surface area than directly upon the scapular cartilage of the equine. The thickness of the fifth layer 70A, 70B is preferably in the range of 0.03 to 0.05 inches.

Once the various layers 50, 64A, 64B, 70A, 70B are bonded together using the preferred adhesive, these layers along with the compression set resistant open-cell microcellular polyurethane foam second layer 34 are enclosed by a sixth layer 80 which is identical to the first layer 20. The sixth layer 80 also includes first and second longitudinal ends 82, 84 an upper surface 86, a lower surface 88 and an outer edge 90.

The polyvinyl chloride blown foam sixth layer 80 provides excellent cushioning to maximize the comfort of both the equine and the rider. The thickness of the sixth layer 80 is preferably in the range of 0.10 to 0.15 inches. The sixth layer 80, just as with the HDPE layers 50, 64A, 64B, 70A, 70B, and the first two foam layers 20, 34 is preferably secured to the HDPE layers and the upper surface of the second foam layer using an adhesive such as the 3M™ Double Coated Tape.

Figure 5:
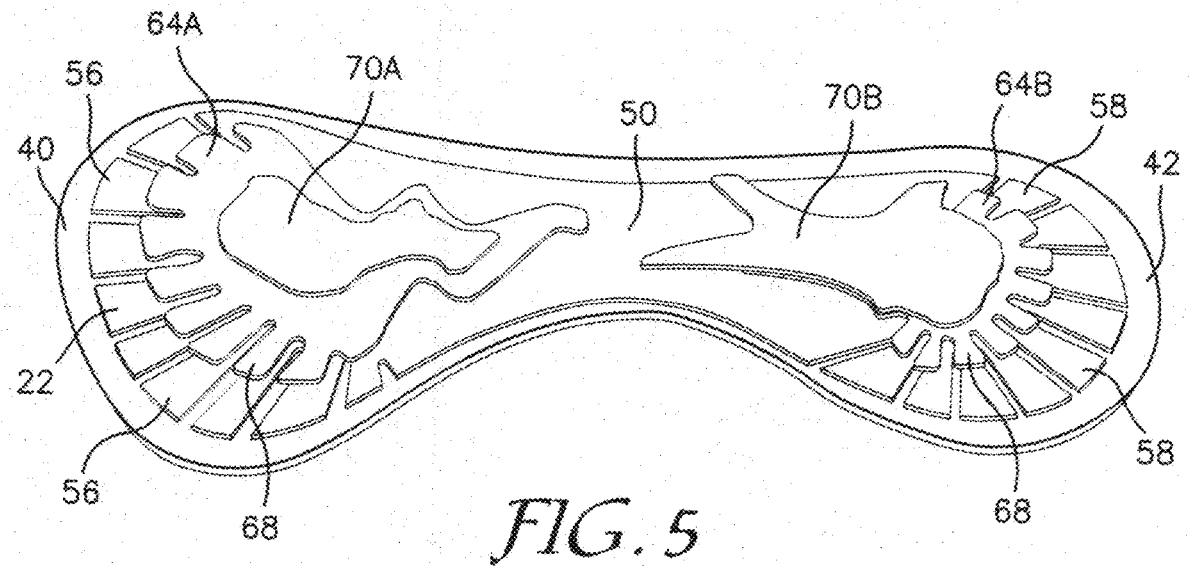
FIG. 5 illustrates a partially assembled flex plate assembly excluding the upper most sixth layer.
Figure 6:
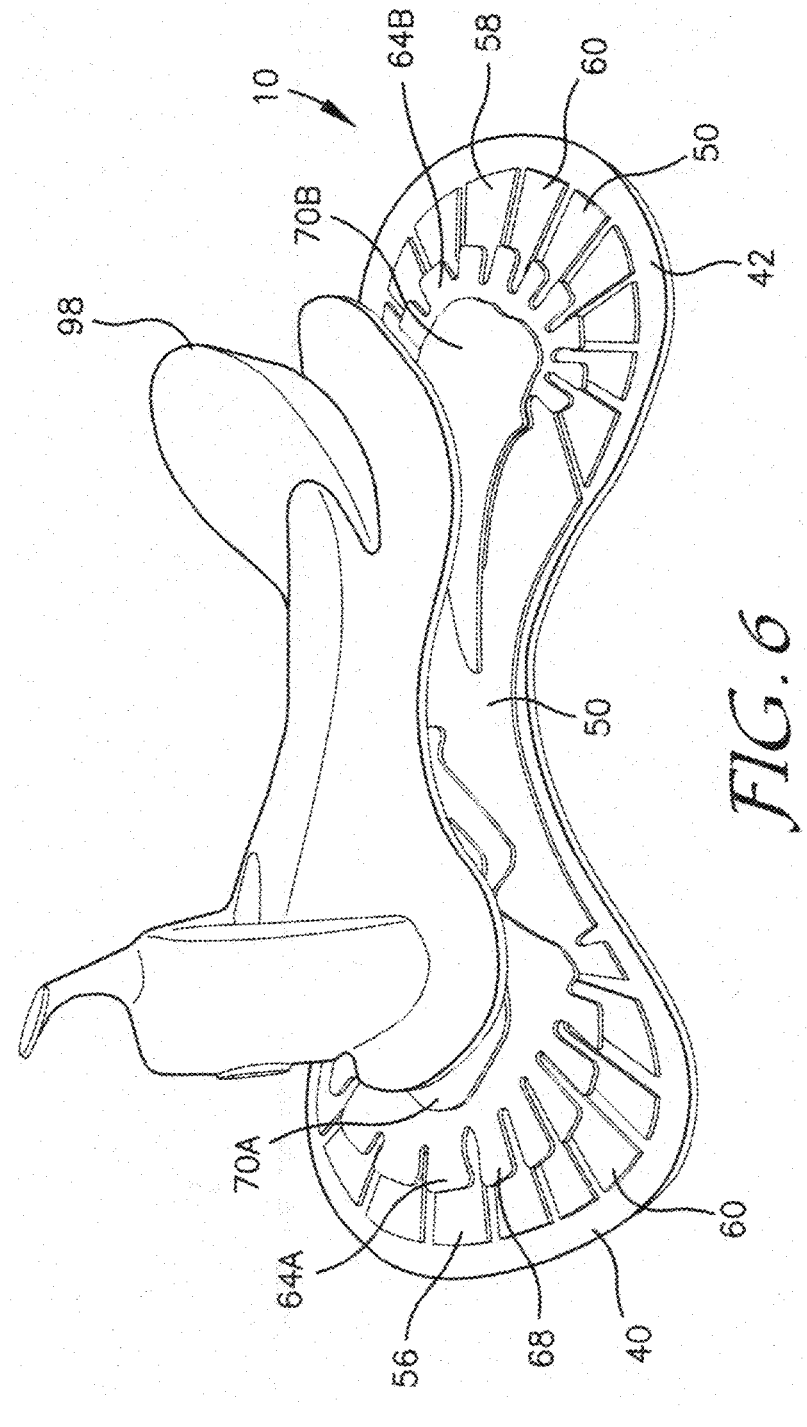
FIG. 6 illustrates a perspective view of a left-side embodiment of the flex-plate assembly positioned beneath a saddle tree.

FIG. 5 illustrates the three HPDE layers positioned atop the compression set resistant open-cell microcellular polyurethane foam second layer 34 and the closed cell polyvinyl chloride blown foam first layer 20 prior to placement of the closed cell polyvinyl chloride blown foam sixth layer 80. FIG. 6 illustrates the placement of a saddle 12 atop the flex plate assembly 10 (minus sixth layer 80). A review of FIGS. 1 and 6 provides the reader with an understanding of how the pocket P of the saddle pad 12 internally houses the fully assembled flex plate assembly 10 detailed above and how the saddle 98 is positioned atop the flex plate assembly 10.

In operation the fully fabricated flex plate assembly 10 is positioned into the pocket P of the saddle pad 12 and then securely enclosed by stitching around the edge of the pocket P.

While a preferred embodiment of this flex plate assembly 10 discloses a total of three HDPE plates, this disclosure contemplates both a lesser and greater number of overlapping HDPE plates. Some or all the plates may be discontinuous while the disclosure also contemplates that all HDPE plates are continuous in configuration. Likewise, it is contemplated that all plates include cantilevered fingers.

In view of the many possible embodiments to which the principles of the disclosed flex plate assembly may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the inventions.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether explicitly described.

After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The method steps described in this disclosure, if any, are not intended to be limited to the specific order presented in the claims. While the steps may be described sequentially for clarity, it is understood that the order of the steps may be altered or rearranged without departing from the scope of the invention. The method is intended to be flexible in its application, allowing for variations in the sequence of steps based on specific implementation requirements, processing capabilities, or other considerations.

As such, the invention encompasses all orders of execution for the steps, provided the desired result or function of the invention is achieved. The disclosed system and method have been described above with reference to one or more preferred embodiments, it will be appreciated that various changes or modifications may be made without departing from the scope of the invention as defined in the appended claims.

The invention claimed is:

1. A multi-layered flex plate assembly for insertion into a saddle pad for use on an equine, comprising:
  a first layer formed from closed-cell polyvinyl chloride blown foam;
  a second layer bonded to an upper surface of the first layer and formed from open-cell microcellular polyurethane foam having a compression-set of <10% at 73° F. per ASTM D1667-90 (Test D) having a thickness between 0.20 and 0.30 inches; and
  a third layer disposed atop the second layer, said third layer formed from high-density polyethylene (HDPE) comprising a contiguous body extending across nearly the full span of the second layer and including, at opposed longitudinal ends, a plurality of cantilevered fingers each having a length of 1.5-3.0 inches and gaps of 0.15-0.25 inches, the fingers being capable of bi-directional flexure,
wherein the assembly is configured to distribute pressure applied by a saddle and rider across the equine's scapular cartilage to reduce localized stress points.

2. A flex plate assembly for reducing pressure concentrations in equine saddle pads, the assembly comprising:
  a layered structure including a viscoelastic open-cell polyurethane foam core, having a compression-set of <10% at 73° F. per ASTM D1667-90 (Test D), a high-density polyethylene support layer with cantilevered fingers, each having a length of 1.5-3.0 inches and gaps of 0.15-0.25 inches, and a covering outer layer of closed-cell polyvinyl chloride foam,
  wherein the polyurethane foam is adapted to absorb and dissipate impact forces over time without bottoming out, and the cantilevered fingers of the polyethylene layer are arranged to permit dynamic flexure in response to scapular movement during equine locomotion.

3. A pressure-dissipating insert for a saddle pad, comprising:

a first cushioning layer of closed-cell polyvinyl chloride foam;

a second energy-absorbing layer of compression set resistant open-cell microcellular polyurethane foam, meeting the compression-set criterion of claim 1;

a third load-distributing layer of HDPE with multiple cantilevered fingers;

a fourth HDPE layer with overlapping cantilevered fingers positioned at opposed ends of the third layer;

a fifth HDPE reinforcement layer disposed atop the fourth layer but not extending over the cantilevered fingers; and a sixth layer of closed-cell polyvinyl chloride foam enclosing the pressure dissipating insert;

wherein the layers are bonded together using a double-coated acrylic adhesive tape having (i) compatibility with low-surface-energy (LSE) plastics and (ii) a 90° peel of about 24 oz/inch as per ASTM D3330.

4. A flex plate assembly for insertion into a pocket of a saddle pad, the flex plate assembly comprising:

(a) a first layer comprising a closed cell polyvinyl chloride blown foam with first and second longitudinal ends, an upper surface, a lower surface and an outer edge;

(b) a second layer disposed atop and bonded to the upper surface of the first layer, the second layer comprising an open-cell microcellular polyurethane foam having a compression-set of <10% at 73° F. per ASTM D1667-90 (Test D), the second layer further comprising first and second longitudinal ends, an upper surface and a lower surface;

(c) at least one high-density polyethylene layer with an upper surface, a lower surface, a surface area of less than the first layer and overlaying a portion of the upper surface of the second layer, the at least one high-density polyethylene layer further comprising at least one of:

(i) a continuous layer extending across nearly the entire span of the second layer with a plurality of cantilevered fingers capable of bidirectional flexure;

(ii) a continuous layer extending across nearly the entire span of the second layer without a plurality of cantilevered fingers;

(iii) a discontinuous layer disposed at opposing longitudinal ends of the second layer; or (iv) a discontinuous layer disposed at opposing longitudinal ends of the second layer with a plurality of cantilevered fingers capable of bidirectional flexure; and (d) a final layer comprising a closed cell polyvinyl chloride blown foam with first and second longitudinal ends, an upper surface, a lower surface and an outer edge.

5. The flex plate assembly of claim 4, wherein the high-density polyethylene (HDPE) layers comprise a thickness in the range of 0.03 to 0.05 inches.

6. The flex plate assembly of claim 4, wherein the second layer comprises a thickness in the range of 0.20 to 0.30 inches.

7. The flex plate assembly of claim 4, wherein the first and sixth layers comprise a thickness in the range of 0.10 to 0.15 inches.

8. The flex plate assembly of claim 4, wherein a portion of the layers of the high-density polyethylene are positioned over the scapula of an equine.

* * * * *